(12) United States Patent
Nakamura et al.

(10) Patent No.: US 10,663,927 B2
(45) Date of Patent: May 26, 2020

(54) INFORMATION EQUIPMENT, CONTROL APPARATUS AND CONTROL METHOD

(71) Applicant: KYOCERA Corporation, Kyoto (JP)

(72) Inventors: Kazutaka Nakamura, Yokohama (JP); Takashi Inoue, Zama (JP); Daisuke Hoshi, Sakura (JP)

(73) Assignee: KYOCERA Corporation, Kyoto (JP)

( * ) Notice: Subject to any disclaimer, the term of this patent is extended or adjusted under 35 U.S.C. 154(b) by 752 days.

(21) Appl. No.: 14/783,408

(22) PCT Filed: Apr. 8, 2014

(86) PCT No.: PCT/JP2014/060209
§ 371 (c)(1),
(2) Date: Feb. 2, 2016

(87) PCT Pub. No.: WO2014/168150
PCT Pub. Date: Oct. 16, 2014

(65) Prior Publication Data
US 2016/0147199 A1 May 26, 2016

(30) Foreign Application Priority Data

Apr. 9, 2013 (JP) .................................. 2013-081677

(51) Int. Cl.
*G05B 9/02* (2006.01)
*G05B 15/02* (2006.01)
(Continued)

(52) U.S. Cl.
CPC ............... *G05B 9/02* (2013.01); *G05B 15/02* (2013.01); *H02J 13/0006* (2013.01);
(Continued)

(58) Field of Classification Search
CPC ....... G05B 15/02; G05B 9/02; H04L 12/2829; H02B 70/325; Y04S 20/228
See application file for complete search history.

(56) References Cited

U.S. PATENT DOCUMENTS 5,633,857 A * 5/1997 Kim ........................ H04L 12/40
370/242
5,940,431 A * 8/1999 Haartsen ........... H04W 52/0216
375/131
(Continued)

FOREIGN PATENT DOCUMENTS

JP 2004-295827 A 10/2004
JP 2007-235753 A 9/2007
(Continued)

OTHER PUBLICATIONS

Extended European Search Report dated Nov. 17, 2016 issued by the European Patent Office in counterpart European Patent Application No. 14782081.5.
(Continued)

*Primary Examiner* — Kenneth M Lo
*Assistant Examiner* — Mohammad A Rahman
(74) *Attorney, Agent, or Firm* — Procopio Cory Hargreaves and Savitch LLP

(57) ABSTRACT

An information equipment 300 located in a consumer's facility 300 includes a reception unit 310 and a transmission unit 320 that performs transmission and reception of a command conforming to a predetermined protocol with a HEMS 200 via a network connected to the HEMS 200, and receives an operational instruction from the HEMS 200 and a control unit 340 that controls an operation of the information equipment 300 according to the operational instruction. The transmission unit 320 transmits a breakdown notification message indicating that the network has had a
(Continued)

breakdown to the HEMS 200 when the network is restored after the breakdown.

20 Claims, 8 Drawing Sheets

(51) Int. Cl.
 *H02J 13/00* (2006.01)
 *H04L 12/28* (2006.01)
(52) U.S. Cl.
 CPC ........ *H04L 12/2829* (2013.01); *Y02B 70/325* (2013.01); *Y04S 20/228* (2013.01)

(56) References Cited

U.S. PATENT DOCUMENTS

| | | | | |
|---|---|---|---|---|
| 6,256,662 | B1* | 7/2001 | Lo | H04N 1/00236 709/203 |
| 7,724,690 | B2* | 5/2010 | Hara | H04J 14/0241 370/258 |
| 8,464,219 | B1* | 6/2013 | Wilkerson | G06F 11/3664 717/120 |
| 9,678,491 | B2* | 6/2017 | Joko | F17D 5/02 |
| 2002/0181412 | A1* | 12/2002 | Shibasaki | H04L 25/0226 370/252 |
| 2004/0086087 | A1* | 5/2004 | Gonsalves | H04L 41/06 379/32.01 |
| 2009/0033272 | A1 | 2/2009 | Winterhalter et al. | |
| 2011/0099623 | A1* | 4/2011 | Garrard | H04L 63/126 726/14 |
| 2013/0085616 | A1* | 4/2013 | Wenzel | H02J 3/14 700/278 |
| 2013/0148509 | A1* | 6/2013 | Low | H04L 41/0686 370/242 |
| 2013/0159806 | A1* | 6/2013 | Okuno | H04L 1/18 714/749 |
| 2013/0204452 | A1 | 8/2013 | Yamaguchi et al. | |
| 2014/0236378 | A1 | 8/2014 | Joko | |
| 2014/0247751 | A1* | 9/2014 | Sonoda | H04L 41/5064 370/254 |
| 2015/0055447 | A1* | 2/2015 | Jamadagni | H04W 48/02 370/216 |
| 2016/0147199 | A1 | 5/2016 | Nakamura et al. | |

FOREIGN PATENT DOCUMENTS

| | | |
|---|---|---|
| JP | 2010-128810 A | 6/2010 |
| JP | 2012-65422 A | 3/2012 |
| JP | 6076807 B2 | 10/2014 |
| WO | 2012/035592 A1 | 3/2012 |
| WO | 2013/047841 A1 | 4/2013 |

OTHER PUBLICATIONS

International Search Report dated Jun. 24, 2014, issued for International Application No. PCT/JP2014/060209.
Written Opinion of the International Searching Authority issued by Japan Patent Office for International Application No. PCT/JP2014/060209.
Office Action dated Jan. 9, 2018 issued in counterpart Japanese Application No. 2017-002546.
Kenji Masuda, Wireless-Enabled Smart Appliances Service, Panasonic Technical Journal vol. 58, No. 3, Oct. 2012, p. 28-33, Japan.

* cited by examiner

FIG. 6
SET COMMAND
(A) 
OPERATION ROUTE SPECIFYING INFORMATION
SET RESPONSE COMMAND
(B) 
OPERATION ROUTE IDENTIFIER
FIG. 7
GET COMMAND
(A) 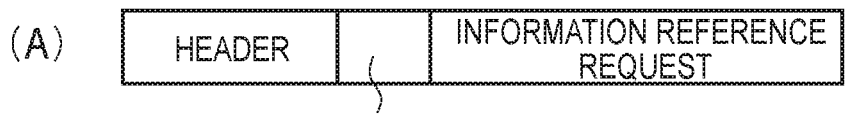
OPERATION ROUTE SPECIFYING INFORMATION
GET RESPONSE COMMAND
(B) 
OPERATION ROUTE IDENTIFIER
FIG. 8
INFO COMMAND
OPERATION ROUTE IDENTIFIER

INFORMATION EQUIPMENT, CONTROL APPARATUS AND CONTROL METHOD

CROSS REFERENCE TO RELATED APPLICATIONS

The present application is a 371 National Stage application which claims the benefit of PCT Application No. PCT/JP2014/060209 filed on 8 Apr. 2014, which claims the benefit of Japanese Application No. 2013-081677, filed on 9 Apr. 2013. The contents of the above applications are incorporated by reference herein in their entirety.

TECHNICAL FIELD

The present invention relates to information equipment located in a consumer's facility, a control apparatus, and a control method.

BACKGROUND ART

In recent years, a control system (energy management system (EMS)) that controls a plurality of pieces of information equipment gets a lot of attention (for example, Patent Document 1). In this control system, a control apparatus that controls a plurality of pieces of information equipment is installed.

Examples of the control apparatus include a home energy management system (HEMS) located in a house, a building energy management system (BEMS) located in a building, a factory energy management system (FEMS) located in a factory, and a store energy management system (SEMS) located in a store.

As a plurality of pieces of information equipment, there are a distributed power supply, a power storage apparatus, a thermal storage apparatus, a load, and the like. The distributed power supply is an apparatus that generates electric power using natural energy such as sunlight, wind power, or geothermal heat such as a solar cell. Alternatively, the distributed power supply is an apparatus that generates electric power using fuel gas such as a fuel cell, for example, a solid oxide fuel cell (SOFC). The power storage apparatus is an apparatus that stores electric power such as a secondary battery. The thermal storage apparatus is an apparatus that converts electric power into heat and stores heat such as a water heater. The load is a refrigerator, illumination, an air conditioner, a television, or the like.

PRIOR ART DOCUMENT

Patent Document

Patent Document 1: Japanese application publication No. 2010-128810

SUMMARY OF THE INVENTION

In addition, with the spread of operation apparatuses such as smartphones, there arises a need in which it is desired to remotely control information equipment through the operation apparatus outside a consumer's facility (a house, a building, a factory, a store, or the like) in which the information equipment is located.

However, the following problem is considered in the remote control of the information equipment. When an operational instruction given from the operation apparatus is transmitted to the information equipment via the control apparatus, if a network connected to the control apparatus has a breakdown, for example, due to a failure of a router, the information equipment may not receive the operational instruction. In this case, content of the operational instruction transmitted from the control apparatus to the information equipment is likely to be different from an operation of the information equipment. For this reason, it is unlikely to sufficiently ensure security of the information equipment depending on content of the operational instruction.

In this regard, the present invention was made to solve the above problem, and it is an object of the present invention to provide information equipment, a control apparatus, and a control method, which are capable of remotely controlling the information equipment in view of a problem such as a security aspect.

Solution to Problem

Information equipment according to a first aspect is information equipment that is controlled by a control apparatus and located in a consumer's facility. The information equipment includes a communication unit that performs transmission and reception of a command conforming to a predetermined protocol with the control apparatus via a network connected to the control apparatus, and receives an operational instruction from the control apparatus and a control unit that controls an operation of the information equipment according to the operational instruction. The communication unit transmits a breakdown notification message indicating that the network has had a breakdown to the control apparatus when the network is restored after the breakdown.

In the first aspect, the information equipment further comprises a storage unit that configured to stores a network breakdown information indicating information related to the breakdown of the network. The breakdown notification message includes the network breakdown information, and is an information notification command that is transmitted to the control apparatus through the communication unit when the control unit detects the restoration of the network.

In the first aspect, the control unit suspends the operation of the information equipment when the breakdown is detected.

In the first aspect, the network breakdown information includes a cause-associated operation state indicating an operation state of the information equipment according to a cause.

In the first aspect, if the information equipment is operating according to the operational instruction, when the breakdown is detected, the control unit suspends the operation of the information equipment, and if the information equipment is operating according to an instruction received without intervention of the control apparatus, even when the breakdown is detected, the control unit does not suspend the operation of the information equipment.

In the first aspect, if the operational instruction is an outside-consumer's facility operational instruction which the control apparatus receives from a server located outside the consumer's facility via the network, and the information equipment is operating according to the outside-consumer's facility operational instruction, when the breakdown is detected, the control unit suspends the operation of the information equipment, and if the operational instruction is an inside-consumer's facility operational instruction which the control apparatus receives via the network without intervention of the server, and the information equipment is operating according to the inside-consumer's facility operational instruction, even when the breakdown is detected, the control unit does not suspend the operation of the information equipment.

In the first aspect, the control unit suspends the operation of the information equipment when a predetermined period of time elapses after the breakdown is detected.

In the first aspect, the control unit transmits the breakdown notification message to the control apparatus when the restoration is detected after the operation of the information equipment is suspended due to the breakdown.

In the first aspect, the communication unit repeatedly transmits the breakdown notification message until a response is received from the control apparatus after the breakdown notification message is transmitted.

In the first aspect, the predetermined protocol is ECHONET Lite.

In the first aspect, the network breakdown information is one of properties of ECHONET equipment object specified in ECHONET Lite.

In the first aspect, when the communication unit receives a request command for requesting notification of a state of the information equipment from the control apparatus after the control unit detects the restoration, the communication unit includes the network breakdown information in a response command for responding to the request command, and transmits the response command to the control apparatus.

A control apparatus according to a second aspect controls information equipment located in a consumer's facility. The control apparatus comprises a communication unit that configured to performs transmission and reception of a command conforming to a predetermined protocol with the information equipment via a network connected to the control apparatus, and transmits an operational instruction to the information equipment. When the network is restored after a breakdown, the communication unit transmits the operational instruction to the information equipment.

In the second aspect, the control apparatus further comprises a storage unit configured to that stores the operational instruction, when a breakdown notification message indicating that the network has had a breakdown is received from the information equipment, the communication unit transmits a setting command including a latest operational instruction stored in the storage unit to the information equipment.

In the second aspect, the communication unit repeatedly transmits a request command for requesting transmission of the breakdown notification message to the information equipment when the network is restored.

In the second aspect, the predetermined protocol is ECHONET Lite.

A control method according to a third aspect is used in a control system including information equipment located in a consumer's facility and a control apparatus that controls the information equipment. The control method comprises a step of performing, by the information equipment and the control apparatus, transmission and reception of a command conforming to a predetermined protocol via a network connected to the control apparatus; a step of operating, by the information equipment, according to an operational instruction given from the control apparatus; a step of transmitting, by the information equipment, a breakdown notification message indicating that the network has had a breakdown to the control apparatus when the network is restored after the breakdown; and a step of transmitting, by the control apparatus, the operational instruction to the information equipment when the control apparatus receives the breakdown notification message.

BRIEF DESCRIPTION OF THE DRAWINGS

FIGS. 6(A) and 6(B) are diagrams illustrating an exemplary message format according to the first embodiment.

FIGS. 7(A) and 7(B) are diagrams illustrating an exemplary message format according to the first embodiment.

FIG. 8 is a diagram illustrating an exemplary message format according to the first embodiment.

DESCRIPTION OF EMBODIMENTS

Figure 1:
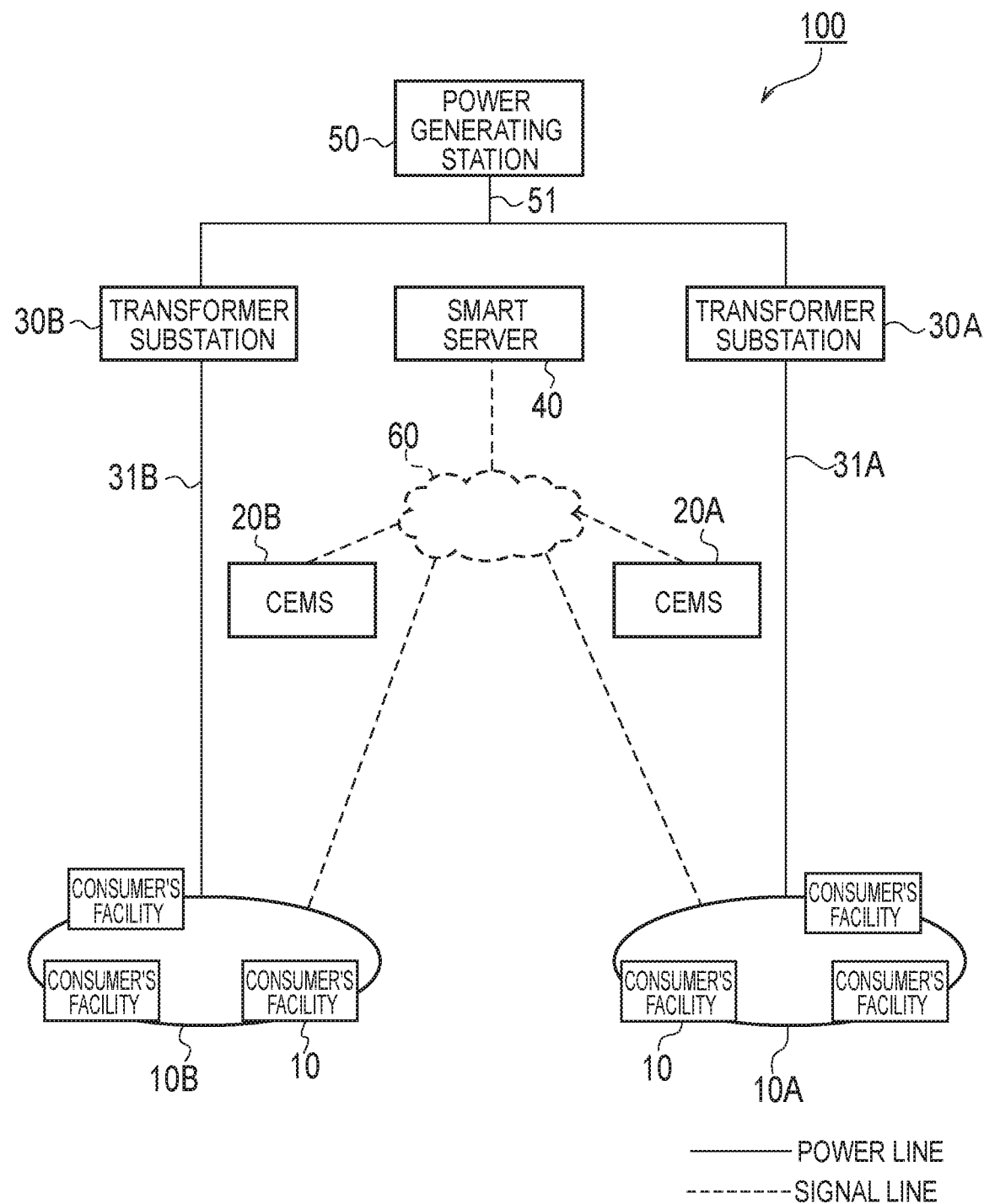
FIG. 1 is a diagram illustrating a control system according to a first embodiment.

Hereinafter, a control system according to an exemplary embodiment of the present invention will be described with reference to the appended drawings. In the following drawings, the same or similar parts are denoted by the same or similar reference numerals.

There are schematic diagrams, and it should be noted that a ratio of each dimension or the like is different from an actual one. Thus, a specific dimension or the like has to be determined in view of the following description. Of course, portions that differ in a relation of dimensions or a ratio are included in the drawings.

OVERVIEW OF EMBODIMENT

Information equipment according the embodiment is information equipment that is controlled by a control apparatus and located in a consumer's facility. The information equipment includes a communication unit that performs transmission and reception of a command conforming to a predetermined protocol with the control apparatus via a network connected to the control apparatus, and receives an operational instruction from the control apparatus and a control unit that controls an operation of the information equipment according to the operational instruction. The communication unit transmits a breakdown notification message indicating that the network has had a breakdown to the control apparatus when the network is restored after the breakdown.

In the embodiment, the communication unit transmits a breakdown notification message indicating that the network has had a breakdown to the control apparatus when the network is restored after the breakdown. Therefore, it is capable of remotely controlling the information equipment in view of a problem such as a security aspect.

First Embodiment

Control System

A control system according to the first embodiment will be described below. FIG. 1 is a diagram illustrating a control system 100 according to the first embodiment.

The control system 100 includes a consumer's facility 10, a CEMS 20, a transformer substation 30, a smart server 40, and a power generating station 50 as illustrated in FIG. 1. The consumer's facility 10, the CEMS 20, the transformer substation 30, and the smart server 40 are connected via a wide area network 60.

The consumer's facility 10 is an example of a consumer's facility including at least one of a distributed power supply, a power storage apparatus, a thermal storage apparatus, and a load. The distributed power supply, the power storage apparatus, the thermal storage apparatus, or the load is an example of information equipment controlled by a control apparatus.

The distributed power supply is an apparatus that generates electric power using natural energy such as sunlight, wind power, or geothermal heat such as a solar cell, for example. Alternatively, the distributed power supply is an apparatus that generates electric power using fuel gas such as a fuel cell, for example. The power storage apparatus is an apparatus that stores electric power such as a secondary battery, for example. The thermal storage apparatus is an apparatus that converts electric power into heat and stores heat such as a water heater, for example. The load is a refrigerator, illumination, an air conditioner, a television, or the like.

The consumer's facility 10 may be, for example, a detached residence, a housing complex such as an apartment house, a commercial facility such as a building, a factory, or a store.

In the first embodiment, a consumer's facility group 10A and a consumer's facility group 10B are configured with a plurality of consumer's facilities 10. The consumer's facility group 10A and the consumer's facility group 10B are classified, for example, according to a geographical region.

The CEMS 20 controls a connection between the plurality of consumer's facilities 10 and a power grid. The CEMS 20 manages the plurality of consumer's facilities 10 and stands for a cluster energy management system. Specifically, the CEMS 20 disconnects the plurality of consumer's facilities 10 from the power grid in the event of a power outage. On the other hand, the CEMS 20 connects the plurality of consumer's facilities 10 with the power grid in the event of power restoration.

In the first embodiment, a CEMS 20A and a CEMS 20B are installed. For example, the CEMS 20A controls a connection between the consumer's facilities 10 included in the consumer's facility group 10A and the power grid. For example, the CEMS 20B controls a connection between the consumer's facilities 10 included in the consumer's facility group 10B and the power grid.

The transformer substation 30 supplies electric power to the plurality of consumer's facilities 10 via a power distribution line 31. Specifically, the transformer substation 30 steps down a voltage supplied from the power generating station 50.

In the first embodiment, a transformer substation 30A and a transformer substation 30B are installed. For example, the transformer substation 30A supplies electric power to the consumer's facilities 10 included in the consumer's facility group 10A via the power distribution line 31A. For example, the transformer substation 30B supplies electric power the consumer's facilities 10 included in the consumer's facility group 10B via the power distribution line 31B.

The smart server 40 manages a plurality of CEMSs 20 (here, the CEMS 20A and the CEMS 20B). The smart server 40 manages a plurality of transformer substations 30 (here, the transformer substation 30A and the transformer substation 30B). In other words, the smart server 40 integrally manages the consumer's facilities 10 included in the consumer's facility group 10A and the consumer's facility group 10B. For example, the smart server 40 has a function of redressing the balance between electric power to be supplied to the consumer's facility group 10A and electric power to be supplied to the consumer's facility group 10B.

The power generating station 50 generates electric power using thermal power, wind power, hydraulic power, nuclear power, or the like. The power generating station 50 supplies electric power to the plurality of transformer substations 30 (here, the transformer substation 30A and the transformer substation 30B) via a power transmission line 51.

The wide area network 60 is connected to the respective apparatuses via signal lines. Examples of the wide area network 60 include the Internet, a wide area line network, a narrow area line network, and a mobile telephone network.

(Consumer's Facility)

Figure 2:
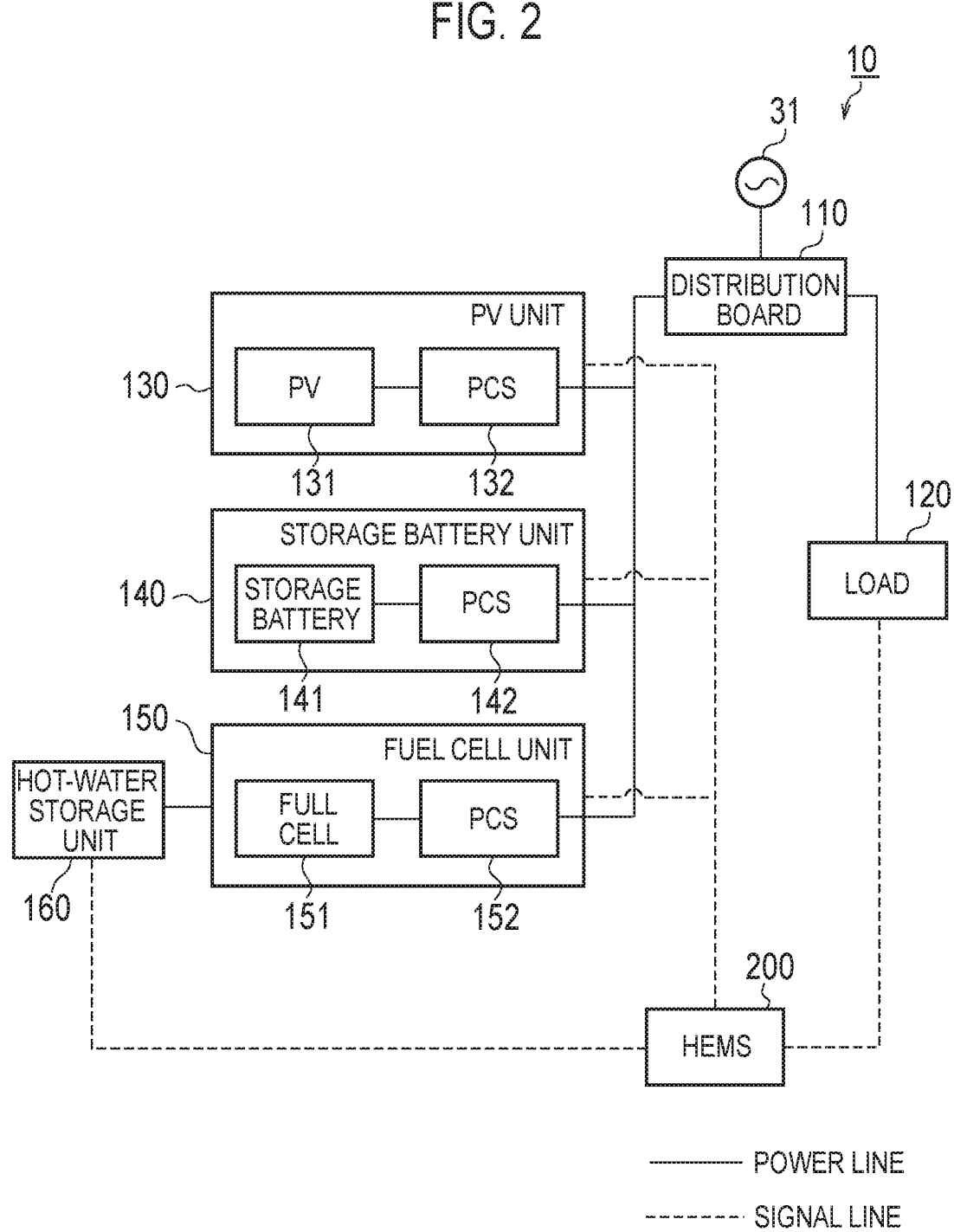
FIG. 2 is a diagram illustrating the details of a consumer's facility according to the first embodiment.

A consumer's facility according to the first embodiment will be described below. FIG. 2 is a diagram illustrating the details of the consumer's facility 10 according to the first embodiment.

The consumer's facility 10 includes a distribution board 110, a load 120, a photovoltaic cell (PV) unit 130, a storage battery unit 140, a fuel cell unit 150, a hot-water storage unit 160, and a HEMS 200 as illustrated in FIG. 2.

The distribution board 110 is connected to the power distribution line 31 (grid). The distribution board 110 is connected to the load 120, the PV unit 130, the storage battery unit 140, and the fuel cell unit 150 via power lines.

The distribution board 110 may include a measuring unit that measures electric power supplied from the power distribution line 31 (grid). The measuring unit may measure power consumption of the load 120.

The load 120 is an apparatus that expends electric power supplied via the power line. For example, the load 120 includes an apparatus such as a refrigerator, illumination, an air conditioner, a television, or the like. The load 120 may include a single apparatus or may include a plurality of apparatuses.

The PV unit 130 includes a PV 131 and a PCS 132. The PV 131 is an exemplary distributed power supply and is an apparatus that is generates electric power according to reception of sunlight. The PV 131 outputs generated DC power. A power generation amount of the PV 131 changes according to an amount of solar radiation with which the PV 131 is irradiated. The PCS 132 is an apparatus (a power conditioning system) that converts the DC power output from the PV 131 into AC power. The PCS 132 outputs the AC power to the distribution board 110 via the power line.

In the first embodiment, the PV unit 130 may include a pyranometer that measures the amount of solar radiation with which the PV 131 is irradiated.

The PV unit 130 is controlled by a maximum power point tracking (MPPT) technique. In detail, the PV unit 130 optimizes an operation point (a point decided by an operation point voltage value and an electric power value or a point decided by an operation point voltage value and a current value) of the PV 131.

The storage battery unit 140 includes a storage battery 141 and a PCS 142. The storage battery 141 is an apparatus that stores electric power. The PCS 142 is an apparatus (power conditioning system) that converts the DC power output from the storage battery 141 into the AC power.

The fuel cell unit 150 includes a fuel cell 151 and a PCS 152. The fuel cell 151 is an exemplary distributed power supply and is an apparatus generates electric power using fuel gas. The PCS 152 is an apparatus (power conditioning system) that converts the DC power output from the fuel cell 151 into the AC power.

The fuel cell unit 150 operates according to load following control. In detail, the fuel cell unit 150 controls the fuel cell 151 such that the electric power output from the fuel cell 151 follows the power consumption of the load 120.

The hot-water storage unit 160 is an exemplary thermal storage apparatus that converts electric power into heat and stores heat. Specifically, the hot-water storage unit 160 includes a hot-water tank, and heats water supplied from the hot-water tank using exhaust heat caused by an operation (power generation) of the fuel cell 151. In detail, the hot-water storage unit 160 heats the water supplied from the hot-water tank, and returns the heated hot water to the hot-water tank.

The HEMS 200 is a control apparatus that manages the information equipment (the load, the distributed power supply, the power storage apparatus, or the thermal storage apparatus) located in the consumer's facility 10.

In the first embodiment, the HEMS 200 is connected to the PV unit 130, the storage battery unit 140, the fuel cell unit 150, and the hot-water storage unit 160 via the signal lines, and controls the PV unit 130, the storage battery unit 140, the fuel cell unit 150, and the hot-water storage unit 160. The HEMS 200 may control the operation mode of the load 120 such that the power consumption of the load 120 is controlled. The signal line that connects the HEMS 200 with the information equipment may be a wireless medium or a wired medium.

The HEMS 200 is connected with various kinds of servers via the wide area network 60. For example, various kinds of servers store information (hereinafter, "energy charge information") such as a purchase unit price of electric power supplied from the grid, a sale unit price of electric power supplied from the grid, and a purchase unit price of fuel gas.

Alternatively, for example, various kinds of servers store information (hereinafter, "energy consumption prediction information") used to predict the power consumption of the load 120. For example, the energy consumption prediction information may be generated based on a previous actual value of the power consumption of the load 120. Alternatively, the energy consumption prediction information may be a power consumption model of the load 120.

Alternatively, for example, various kinds of servers store information (hereinafter, PV power generation amount prediction information) used to predict the power generation amount of the PV 131. The PV power generation prediction information may be a prediction value of the amount of solar radiation with which the PV 131 is irradiated. Alternatively, the PV power generation prediction information may be a weather forecast, a season, a duration of sunlight, or the like.

(Application Scene)

Figure 3:
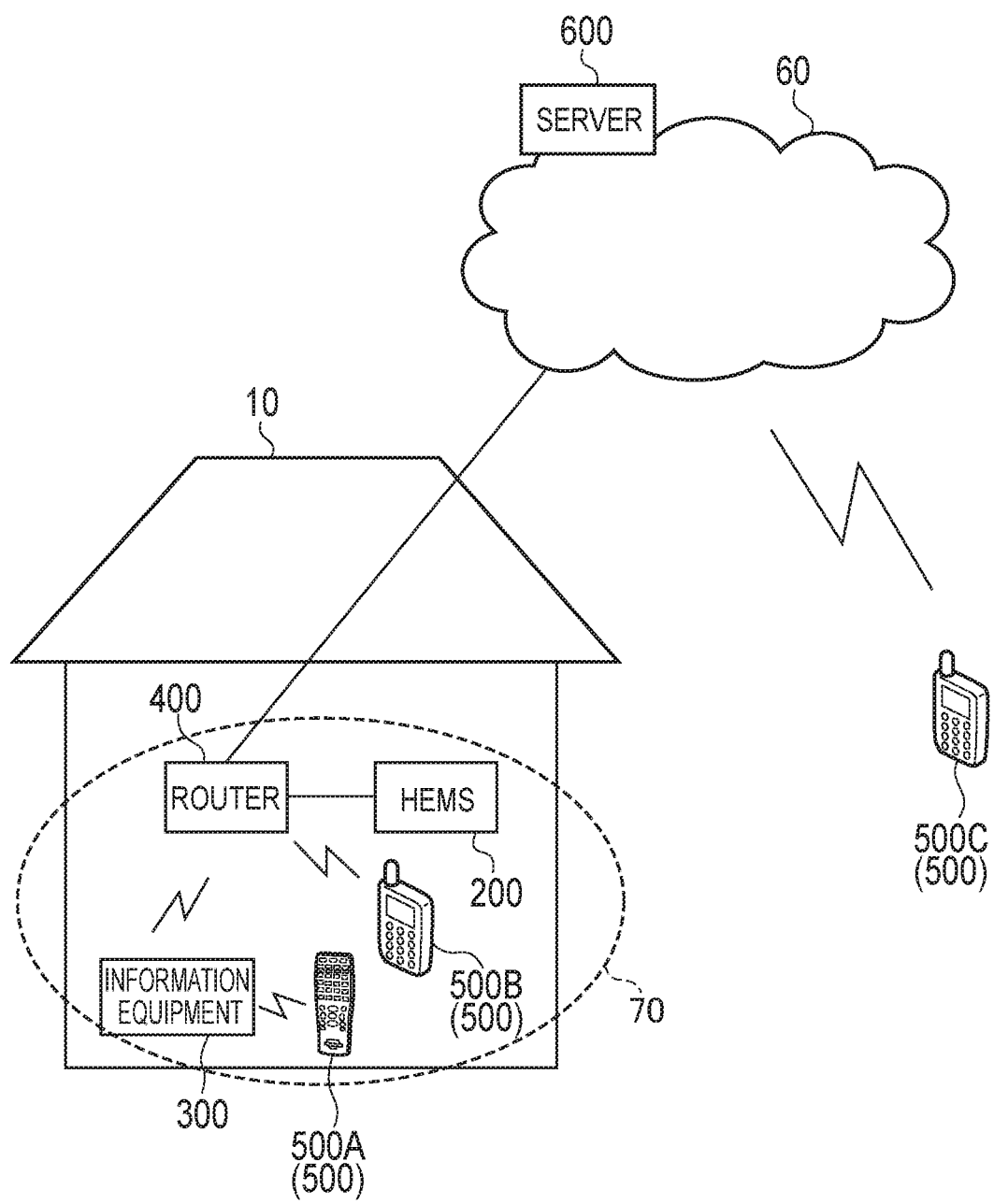
FIG. 3 is a diagram illustrating an application scene according to the first embodiment.

An application scene of the first embodiment will be described below. FIG. 3 is a diagram illustrating the application scene of the first embodiment.

A system according to the application scene of the first embodiment includes a HEMS 200, information equipment 300, a router 400, an operation apparatus 500, and a server 600 as illustrated in FIG. 3.

The HEMS 200 is an exemplary control apparatus that manages the information equipment 300 located in the consumer's facility 10. The HEMS 200 is connected with the router 400 in a wired or wireless manner, and performs communication with the information equipment 300, the operation apparatus 500, and the server 600 via the router 400.

The information equipment 300 is controlled by the HEMS 200 as in the load 120, the PV unit 130, the storage battery unit 140, the fuel cell unit 150, and the hot-water storage unit 160.

The router 400 configures a narrow area network 70 installed in the consumer's facility 10. The router 400 may configure a wireless LAN or a wired LAN as the narrow area network 70. FIG. 3 illustrates an example in which the HEMS 200 is connected with the router 400 in a wired manner, and the information equipment 300 and the operation apparatus 500 are connected with the router 400 in a wireless manner. The HEMS 200 may be connected with the router 400 in a wireless manner, and the information equipment 300 and the operation apparatus 500 may be connected with the router 400 in a wired manner.

The operation apparatus 500 is an operation apparatus that transmits an operational instruction to the information equipment 300. The operation apparatus 500 may be an operation apparatus (for example, a remote controller or an operation button installed in the information equipment 300) that inputs an operation to the information equipment 300 directly without intervention of the router 400 or the HEMS 200. Alternatively, the operation apparatus 500 may be an operation apparatus (for example, a mobile terminal connected to the router 400 in a wireless manner or a personal computer connected to the router 400 in a wired manner) connected to the narrow area network 70. The operation apparatus connected to the narrow area network 70 inputs an operation to the information equipment 300 indirectly via the router 400 and the HEMS 200. Alternatively, the operation apparatus 500 may be an operation apparatus (for example, a mobile terminal that can access the server 600 or a personal computer that can access the server 600) connected to the wide area network 60 different from the narrow area network 70. The operation apparatus connected to the wide area network 60 is not limited to an apparatus carried by the user and may be a server (for example, a server managed by an electric power company) installed on the wide area network 60. A demand response or the like is considered as an operational instruction transmitted from the server.

In FIG. 3, the operation apparatus 500A that inputs an operation to the information equipment 300 directly, the operation apparatus 500B connected to the narrow area network 70, and the operation apparatus 500C connected to the wide area network 60 are illustrated as the operation apparatus 500. It should be noted that when the operational instruction is the demand response or the like, the operation apparatus 500C may be dealt the same way as the server 600.

The server 600 is a server that is installed on the wide area network 60 and receives the operational instruction on the information equipment 300 from the operation apparatus 500C connected to the wide area network 60. It should be noted that the operation apparatus 500C is not necessarily constantly connected to the server 600.

Here, it is undesirable to maintain a session between the HEMS 200 connected to the narrow area network 70 installed in the consumer's facility 10 and the server 600 constantly in terms of security. Commonly, in order to protect an apparatus connected to the narrow area network 70, a firewall is installed between the wide area network 60 and the narrow area network 70. Thus, it is difficult to access the HEMS 200 from the server 600 arbitrarily. In terms of this, it is desirable that the server 600 transmit the operational instruction received from the operation apparatus 500C to the HEMS 200 according to an inquiry that is regularly given from the HEMS 200 to the server 600.

The embodiments are not limited to this example. For example, the operational instruction received from the operation apparatus 500C may be transmitted from the server 600 to the HEMS 200 at an arbitrary timing by causing the firewall to perform port release or the like.

Here, it should be noted that the information equipment 300 operates according to the operational instruction received via the HEMS 200 and the router 400 except when an operation is directly input by the operation apparatus 500A. In this regard, the HEMS 200 regularly performs transmission and reception of a network check command (for example, a ping command) for checking whether or not a network connecting the HEMS 200 with the information equipment 300 has a breakdown with the information equipment 300 via the router 400. Alternatively, the HEMS 200 may regularly perform transmission and reception of a network check command for checking whether or not the network connecting the HEMS 200 with the server 600 has a breakdown with the server 600 via the router 400.

Similarly, the information equipment 300 regularly performs transmission and reception of a network check command for checking whether or not a network connecting the information equipment 300 with the HEMS 200 has a breakdown with the HEMS 200 via the router 400.

(Control Apparatus)

Figure 4:
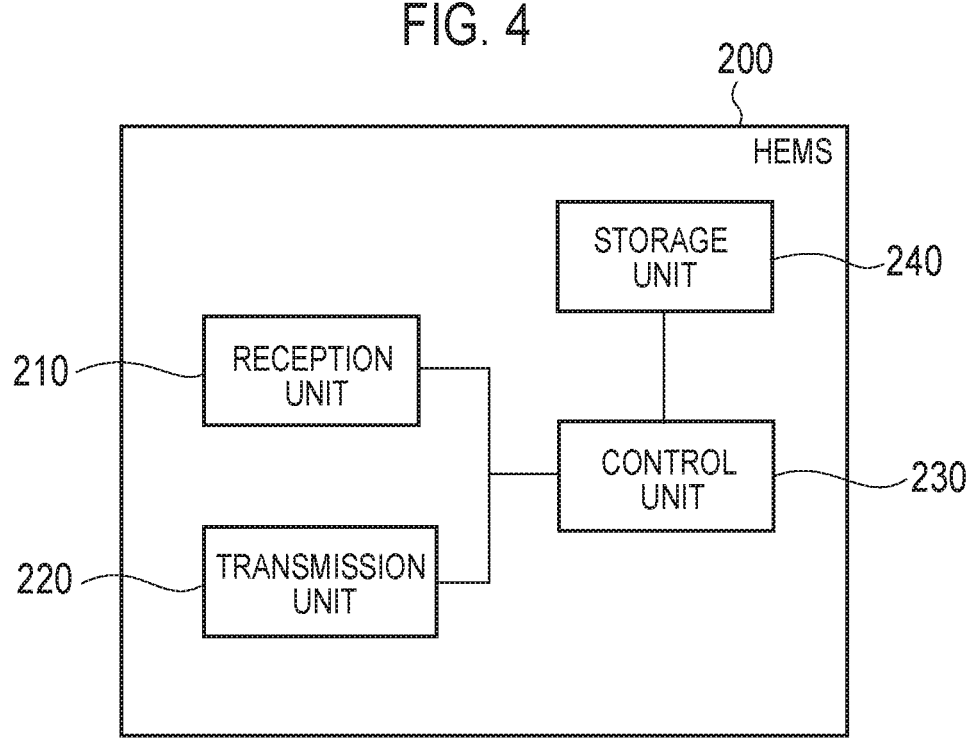
FIG. 4 is a block diagram illustrating a HEMS according to the first embodiment.

A control apparatus according to the first embodiment will be described below. FIG. 4 is a block diagram illustrating the HEMS 200 according to the first embodiment.

The HEMS 200 includes a reception unit 210, a transmission unit 220, a control unit 230, and a storage unit 240 as illustrated in FIG. 4.

In the first embodiment, the reception unit 210 and the transmission unit 220 configure a communication unit that performs transmission and reception of a message conforming to a predetermined protocol with the information equipment 300.

The reception unit 210 receives various kinds of signals from the apparatuses connected via the (wired or wireless) signal lines. For example, the reception unit 210 receives the information indicating the power generation amount of the PV 131 from the PV unit 130. The reception unit 210 receives information indicating a storage amount of the storage battery 141 from the storage battery unit 140. The reception unit 210 receives information indicating the power generation amount of the fuel cell 151 from the fuel cell unit 150. The reception unit 210 receives information indicating a hot water storage amount of the hot-water storage unit 160 from the hot-water storage unit 160.

In the first embodiment, the reception unit 210 receives a command conforming to a predetermined protocol from the information equipment 300 via a network connected to the HEMS 200. When communication between the HEMS 200 and the information equipment 300 is performed according to ECHONET Lite scheme, the reception unit 210 receives messages (a SET response command, a GET response command, and an INFO command) conforming to ECHONET Lite scheme from the respective apparatuses. The SET response command is a response command to a setting command (a SET command) including an operational instruction on the information equipment 300, and includes a setting response indicating a setting result (see FIGS. 6(A) and 6(B) which will be described later). The GET response command is a response command to a request command (a GET command) for requesting reference of information indicating a state of the information equipment 300, and includes information (state information) in which reference is requested (see FIGS. 7(A) and 7(B) which will be described later). The INFO command is a command that is autonomously transmitted from the information equipment 300 without depending on the command on the information equipment 300 from the HEMS 200, and includes state information indicating the state of the information equipment 300 (see FIG. 8 which will be described later).

The reception unit 210 may receive the energy charge information, the energy consumption prediction information and the PV power generation amount prediction information from various kinds of servers via the wide area network 60. The energy charge information, the energy consumption prediction information, and the PV power generation amount prediction information may be stored in the HEMS 200 in advance.

In the first embodiment, the reception unit 210 receives an operational instruction (an inside-consumer's facility operation) from the operation apparatus 500B. The reception unit 210 receives the operational instruction (an outside-consumer's facility operation) received from the operation apparatus 500C from the server 600.

The transmission unit 220 transmits various kinds of signals to the apparatuses connected via the signal line. For example, the transmission unit 220 transmits signals for controls on the load 120, the PV unit 130, the storage battery unit 140, the fuel cell unit 150, and the hot-water storage unit 160 to the respective apparatuses.

In the first embodiment, the transmission unit 220 transmits a command conforming to a predetermined protocol to the information equipment 300 via the network connected to the HEMS 200. When communication between the HEMS 200 and the information equipment 300 is performed according to ECHONET Lite scheme, the transmission unit 220 transmits the messages (the SET command and the GET command) conforming to ECHONET Lite scheme to the respective apparatuses. The SET command is the setting command including the operational instruction on the information equipment 300 (see FIG. 6(A) which will be described later). The GET command is the request command for requesting reference of the information indicating the state of the information equipment 300 (see FIG. 7(A) which will be described later).

In the first embodiment, the transmission unit 220 transmits an inquiry about the operational instruction received from the operation apparatus 500C to the server 600.

In the first embodiment, the transmission unit 220 transmits the operational instruction to the information equipment 300. The operational instruction includes an instruction input by the inside-consumer's facility operation performed by the operation apparatus 500B connected to the narrow area network 70 and an instruction input by the outside-consumer's facility operation performed by the operation apparatus 500C connected to the wide area network 60 in addition to an operational instruction generated by the control unit 230 (which will be described later) in order to control the operation of the information equipment 300.

The transmission unit 220 transmits the operational instruction to the information equipment 300 so that a transmission source (that is, the HEMS 200, the operation apparatus 500B or the operation apparatus 500C) of the operational instruction is identified. When communication between the HEMS 200 and the information equipment 300 is performed according to ECHONET Lite scheme, for example, the transmission unit 220 includes the operational instruction and an operation route specifying information identifying the transmission source of the operational instruction in the existing message (the SET command) in ECHONET Lite scheme, and transmits the resulting message. For example, a 1-bit flag may be used as the operation route specifying information.

Next, an example in which a network has a breakdown and then is recovered will be described. Here, the network means a communication line of a range in which the HEMS 200 can detect the presence or absence of a breakdown by transmitting and receiving the network check command, and specifically refers to a network (the narrow area network 70) connecting the HEMS 200 with the information equipment 300 or a network (the wide area network 60 and the narrow area network 70) connecting the HEMS 200 with the server 600.

In the first embodiment, when the network is restored after the breakdown, the transmission unit 220 transmits the operational instruction to the information equipment 300. In detail, when the network is restored, the transmission unit 220 repeatedly transmits a request command (the GET command) for requesting transmission of a breakdown notification message (which will be described later) to the information equipment 300. Upon the reception unit 210 receiving the breakdown notification message from the information equipment 300, the transmission unit 220 transmits a setting command (the SET command) including the latest operational instruction stored in the storage unit 240 (which will be described later) to the information equipment 300.

For example, even when the breakdown of the network between the HEMS 200 and the information equipment 300 is detected, the HEMS 200 hardly detects whether or not the information equipment 300 is continuously operating according to the operational instruction received from the HEMS 200 or whether or not the operation has suspended in view of security. In this regard, the transmission unit 220 repeatedly transmits the request command (the GET command) to the information equipment 300 after the network is restored. When the reception unit 210 receives the GET response command from the information equipment 300, and the information equipment 300 also detects the breakdown of the network, the transmission unit 220 transmits (retransmits) the latest operational instruction stored in the storage unit 240 to the information equipment 300. As a result, the information equipment 300 can return to the same operation state as the operation state before the breakdown of the network.

When the information equipment 300 is operating according to the direct operation performed by the operation apparatus 500A, communication between the operation apparatus 500A and the information equipment 300 is not influenced although the network has a breakdown. As will be described later, when the HEMS 200 detects that the information equipment 300 is operating according to the direct operation performed by the operation apparatus 500A through an operation type identifier included in a message (an INFO command or the like) received from the information equipment 300, the transmission unit 220 may omit transmission of the request command and transmission of the operational instruction.

Referring back to FIG. 4, the control unit 230 controls the operation of the HEMS 200. The control unit 230 controls the load 120, the PV unit 130, the storage battery unit 140, the fuel cell unit 150, and the hot-water storage unit 160.

In the first embodiment, the control unit 230 controls the operation of the information equipment 300. In detail, the control unit 230 generates the operational instruction on the information equipment 300, and transmits the operational instruction to the information equipment 300 through the transmission unit 220.

In the first embodiment, the control unit 230 determines the route type (the transmission source) of the operational instruction on the information equipment 300 received from another equipment rather than the operational instruction generated by the control unit 230. In detail, when the operational instruction is not given via the server 600 installed on the wide area network 60, the control unit 230 determines the route type to be the inside-consumer's facility operation. On the other hand, when the operational instruction is given via the server 600 installed on the wide area network 60, determines the route type to be the outside-consumer's facility operation.

As described above, when the route type is the inside-consumer's facility operation, the operational instruction is transmitted from the operation apparatus 500B to the HEMS 200 via the router 400. Thus, the control unit 230 can determine that the operational instruction is not transmitted via the server 600 by checking a transmission source IP address of the operational instruction. On the other hand, when the route type is the outside-consumer's facility operation, the operational instruction received from the operation apparatus 500C by the server 600 is transmitted from the server 600 to the HEMS 200. Thus, the control unit 230 can determine that the operational instruction is transmitted via the server 600 by checking the transmission source IP address of the operational instruction.

The storage unit 240 stores information necessary when the control unit 230 controls the load 120, the PV unit 130, the storage battery unit 140, the fuel cell unit 150, and the hot-water storage unit 160. The storage unit 240 stores information necessary for control and management of the equipment 300.

In the first embodiment, the storage unit 240 stores the operational instruction on the equipment 300. The storage unit 240 stores the operational instruction on the equipment 300 and the route type (the transmission source) of the operational instruction in association with each other.

(Information Equipment)

Figure 5:
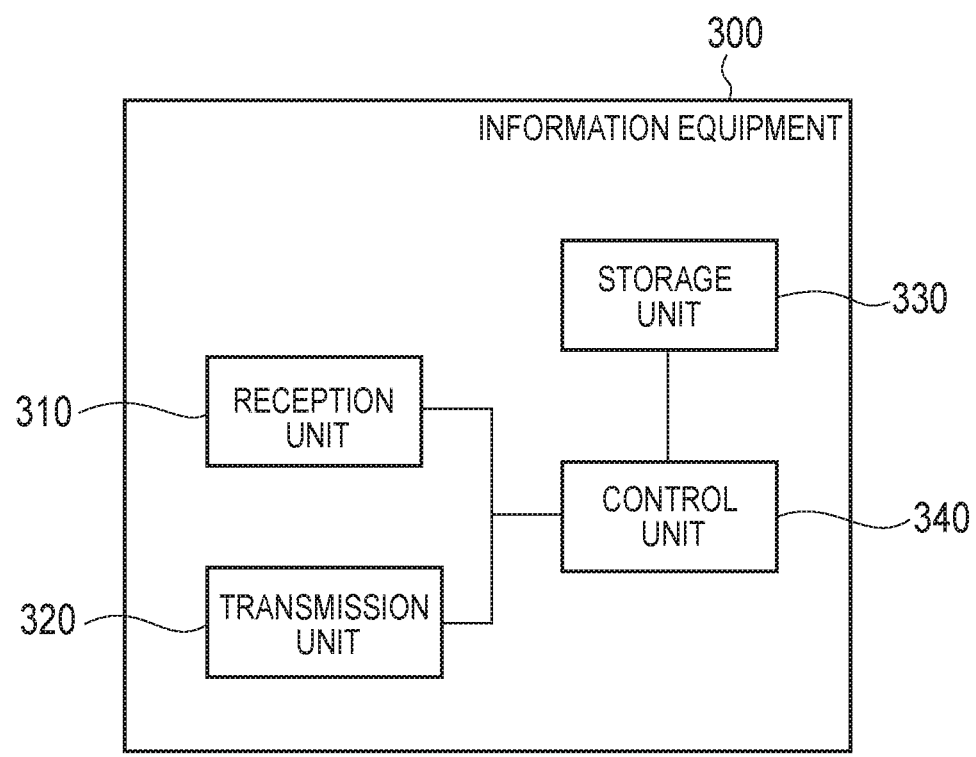
FIG. 5 is a block diagram illustrating information equipment according to the first embodiment.

Information equipment according to the first embodiment will be described below. FIG. 5 is a block diagram illustrating the information equipment 300 according to the first embodiment.

The information equipment 300 includes a reception unit 310, a transmission unit 320, a storage unit 330, and a control unit 340 as illustrated in FIG. 5.

In the first embodiment, the reception unit 310 and the transmission unit 320 configure a communication unit that performs transmission and reception of a message conforming to a predetermined protocol with the HEMS 200.

The reception unit 310 receives various kinds of signals from the apparatuses connected via the (wireless or wired) signal lines. Specifically, the reception unit 310 receives the operational instruction from the operation apparatus 500A or the HEMS 200. The operational instruction given from the HEMS 200 includes the operational instruction given from the operation apparatus 500B or the operation apparatus 500C in addition to the operational instruction generated by the HEMS 200 (the control unit 230).

When communication between the HEMS 200 and the information equipment 300 is performed according to ECHONET Lite scheme, the reception unit 310 receives the messages (the SET command and the GET command) conforming to ECHONET Lite scheme from the HEMS 200.

In the first embodiment, the reception unit 310 receives the operational instruction of the first format from the HEMS 200 when the route type is the inside-consumer's facility operation. On the other hand, the reception unit 310 receives the operational instruction of the second format different from the first format from the HEMS 200 when the route type is the outside-consumer's facility operation.

The transmission unit 320 transmits various kinds of signals to the apparatuses connected via the (wireless or wired) signal lines.

When communication between the HEMS 200 and the information equipment 300 is performed according to ECHONET Lite scheme, the transmission unit 320 transmits the messages (the SET response command, the GET response command, and the INFO command) conforming to ECHONET Lite scheme to the HEMS 200.

In detail, upon receiving the setting command including the operational instruction on the information equipment 300, the transmission unit 320 notifies the HEMS 200 of an operation route identifier indicating the route type of the operational instruction included in the setting command. For example, upon receiving the SET command, the transmission unit 320 transmits the SET response command including the operation route identifier indicating the route type of the operational instruction included in the SET command to the HEMS 200 as illustrated in FIG. 6(B).

Alternatively, upon receiving the request command requesting reference of the information indicating the state of the information equipment 300, the transmission unit 320 notifies the HEMS 200 of the operation route identifier indicating the route type of the operational instruction received before the request command is received. For example, upon receiving the GET command, the transmission unit 320 transmits the GET response command including the operation route identifier indicating the route type of the operational instruction received before the GET command is received to the HEMS 200 as illustrated in FIG. 7(B). In other words, the transmission unit 320 transmits the GET response command including the operation route identifier indicating an operation route through which a current operation has been instructed to the HEMS 200.

Alternatively, when a variable stored in the storage unit 330 (which will be described later) is changed, the transmission unit 320 notifies the HEMS 200 of the operation route identifier indicating the changed variable. For example, the transmission unit 320 transmits the INFO command including the operation route identifier indicating the changed variable to the HEMS 200 as illustrated in FIG. 8.

Next, an example in which the network has a breakdown and then is restored will be described. Here, the network means a communication line of a range in which the information equipment 300 can detect the presence or absence of breakdown according to transmission and reception of the network check command, and specifically refers to the network (the narrow area network 70) connecting the information equipment 300 with the HEMS 200.

In the first embodiment, the transmission unit 320 transmits the breakdown notification message indicating that the network has had a breakdown to the HEMS 200 when the network is restored after the breakdown.

The breakdown notification message includes network breakdown information which will be described later. When a predetermined protocol is ECHONET Lite, the breakdown notification message is the INFO command that is transmitted from the transmission unit 320 to the HEMS 200 when the control unit 340 detects the restoration of the network.

Alternatively, as will be described later, the transmission unit 320 may transmit the breakdown notification message to the HEMS 200 when the restoration of the network is detected after the operation of the information equipment 300 has been suspended due to the breakdown.

In the first embodiment, the transmission unit 320 repeatedly transmits the breakdown notification message until the reception unit 310 receives a response from the HEMS 200 after the breakdown notification message is transmitted.

For example, even when the breakdown of the network between the information equipment 300 and the HEMS 200 is detected, the HEMS 200 hardly detects whether or not the information equipment 300 is continuously operating according to the operational instruction received from the HEMS 200 or whether or not the operation has been suspended in view of security. In this regard, the transmission unit 320 causes the HEMS 200 to detect the state of the information equipment 300 by repeatedly transmitting the breakdown notification message (the INFO command) to the HEMS 200 after the restoration of the network. When the reception unit 310 receives the latest operational instruction from the HEMS 200, the information equipment 300 can return to the same operation state as the operation state before the breakdown of the network.

When the information equipment 300 is operating according to the direct operation performed by the operation apparatus 500A, communication between the operation apparatus 500A and the information equipment 300 is not influenced although the network has a breakdown. Thus, when the information equipment 300 is operating according to the direct operation performed by the operation apparatus 500A, the transmission unit 220 does not transmit the breakdown notification message.

The storage unit 330 stores the variable indicating the route type of the operational instruction on the information equipment 300.

As described above, the variable indicating the route type of the operational instruction on the information equipment 300 includes the variable indicating an operation in which the HEMS 200 is the transmission source, the variable indicating the inside-consumer's facility operation in which an operation is input to the information equipment 300 from the operation apparatus 500B connected to the narrow area network installed in the consumer's facility 10 and the variable indicating the outside-consumer's facility operation in which an operation is input to the information equipment 300 from the operation apparatus 500C connected to the wide area network 60 different from the narrow area network 70.

The variable indicating the inside-consumer's facility operation may include a variable indicating a direct operation in which an operation is directly input to the information equipment 300 without intervention of another equipment (for example, the HEMS 200 or the router 400) and a variable indicating an indirect operation in which an operation is indirectly input to the information equipment 300 via another equipment (for example, the HEMS 200 or the router 400).

The direct operation may be an operation of the operation button installed in the information equipment 300 or may be an operation using the remote controller associated with the information equipment 300. The indirect operation may be an operation using the operation apparatus 500B connected to the narrow area network 70 installed in the consumer's facility 10.

In the first embodiment, the storage unit 330 stores the network breakdown information related to the breakdown of the network. For example, the network breakdown information includes a time at which the breakdown occurred in the network and a time at which the network was restored. The network includes the wide area network 60 and the narrow area network 70.

In the first embodiment, the network breakdown information further includes a cause-associated operation state that indicates the operation state of the information equipment 300 according to a cause. Specifically, examples of the cause-associated operation state include activation, suspension, remote activation (the inside-consumer's facility operation), remote activation (the outside-consumer's facility operation), remote suspension (the inside-consumer's facility operation), remote suspension (the outside-consumer's facility operation), and suspension caused by network breakdown detection.

When a predetermined protocol is ECHONET Lite, the network breakdown information is one of properties of ECHONET equipment object specified in ECHONET Lite.

After the control unit 340 detects the restoration of the network, when the reception unit 310 receives the request command (the GET command) requesting notification of the state of the information equipment 300 from the HEMS 200, the transmission unit 320 may include the network breakdown information in the GET response command that is transmitted in response to the request command and transmit the resulting GET response command to the HEMS 200.

The control unit 340 controls the operation of the information equipment 300. Specifically, the control unit 340 controls the operation of the information equipment 300 according to the operational instruction.

In the first embodiment, the control unit 340 determines the route type of the operational instruction. The control unit 340 can specify any one of the operation performed by the HEMS 200, the inside-consumer's facility operation, and the outside-consumer's facility operation according to the operation route specifying information included in the message including the operational instruction. The control unit 340 can specify the direct operation and thus can specify any other operation than the direct operation. Thus, the control unit 340 can specify that the inside-consumer's facility operation is the direct operation and specify that the inside-consumer's facility operation is the indirect operation as well.

In the first embodiment, the control unit 340 detects whether or not the network has a breakdown. In detail, the control unit 340 detects whether or not the network with the router 400 has a breakdown by regularly performing transmission and reception of the network check command (for example, the ping command) with the HEMS 200 via the reception unit 310 and the transmission unit 320. Alternatively, the control unit 340 regularly performs transmission and reception of the network check command with the server 600.

In the first embodiment, when the breakdown of the network is detected, the control unit 340 suspends the operation of the information equipment 300. Alternatively, when a predetermined period of time T1 has elapsed after the breakdown of the network is detected, the control unit 340 may suspend the operation of its own equipment.

Here, it should be noted that when the information equipment 300 is operating according to the operational instruction received from the HEMS 200, if the breakdown of the network is detected, the control unit 340 suspends the operation of the information equipment 300, but when the information equipment 300 is operating according to the instruction (that is, an instruction given by the direct operation performed by the operation apparatus 500A) received without intervention of the HEMS 200, the control unit 340 does not suspend the operation of the information equipment 300 even if the breakdown of the network is detected.

Alternatively, when the operational instruction is the operational instruction (that is, an outside-consumer's facility operational instruction given by the operation apparatus 500C) which the HEMS 200 has received from the server 600 installed on the wide area network 60 via the network, and the information equipment 300 is operating according to the outside-consumer's facility operational instruction, if the breakdown of the network is detected, the control unit 340 suspends the operation of its own equipment. On the other hand, when the operational instruction is the operational instruction (that is, an inside-consumer's facility operational instruction given by the operation apparatus 500B) which the HEMS 200 has received via the network without intervention of the server 600, and the information equipment 300 is operating according to the inside-consumer's facility operational instruction, although the breakdown of the network is detected, the control unit 340 may not suspend the operation of the information equipment 300. It is because in the case of the inside-consumer's facility operational instruction given by the operation apparatus 500B, the operator is considered to be able to input the operational instruction within the consumer's facility, that is, nearby the information equipment 300 and check the operation state of the information equipment 300.

(Control Method)

Figure 9:
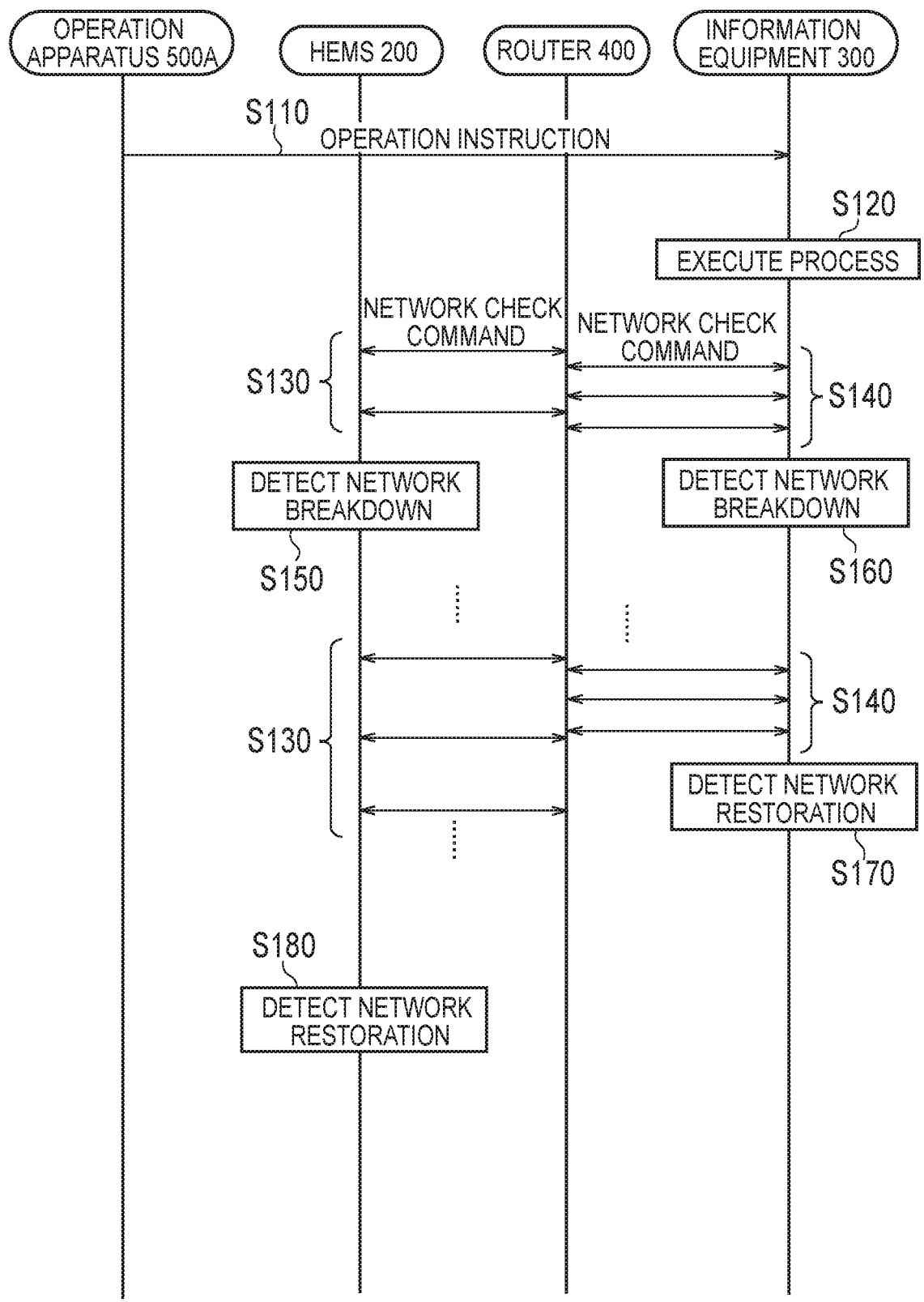
FIG. 9 is a sequence diagram illustrating a control method according to the first embodiment.
Figure 10:
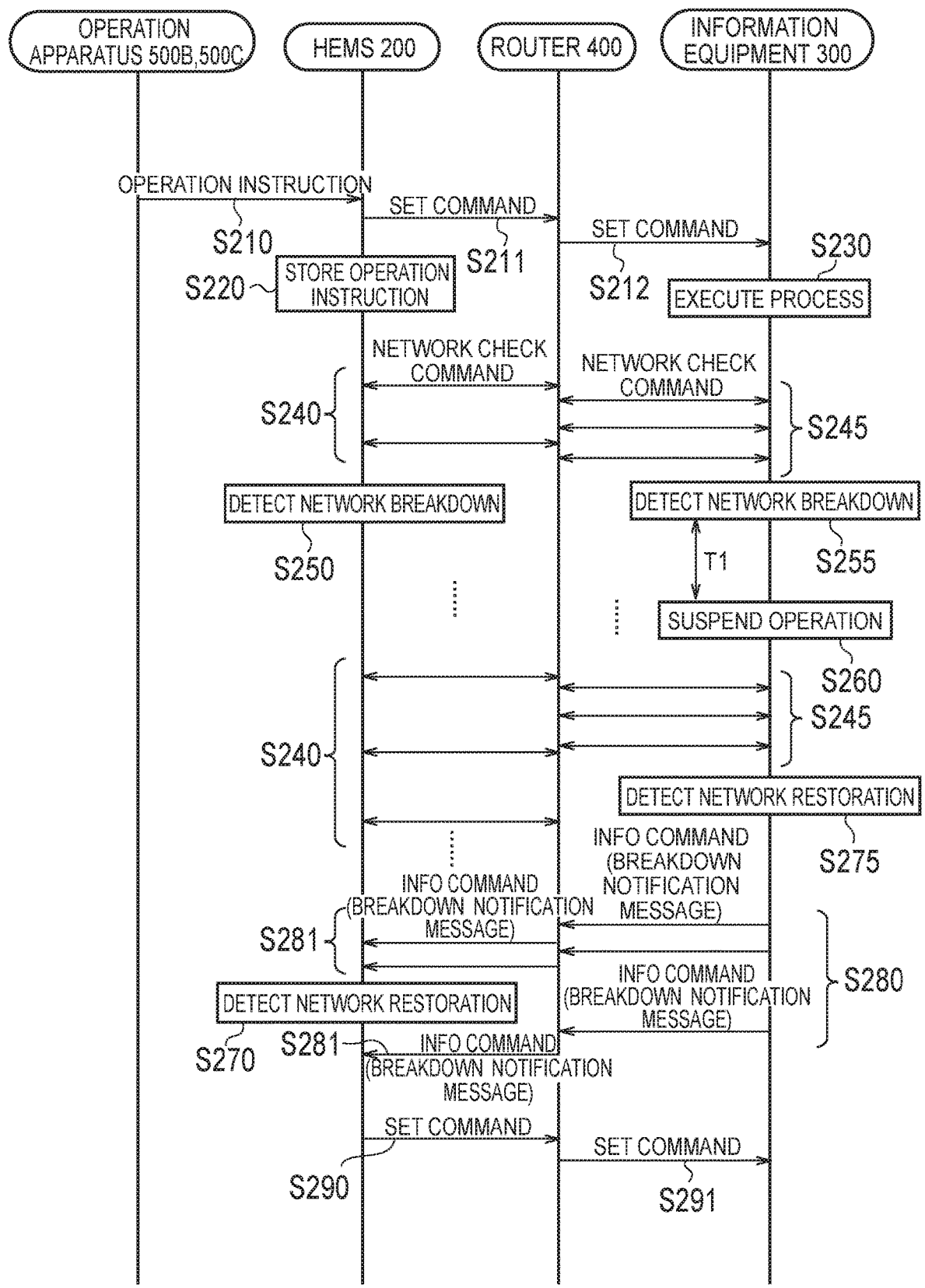
FIG. 10 is a sequence diagram illustrating a control method according to the first embodiment.
Figure 11:
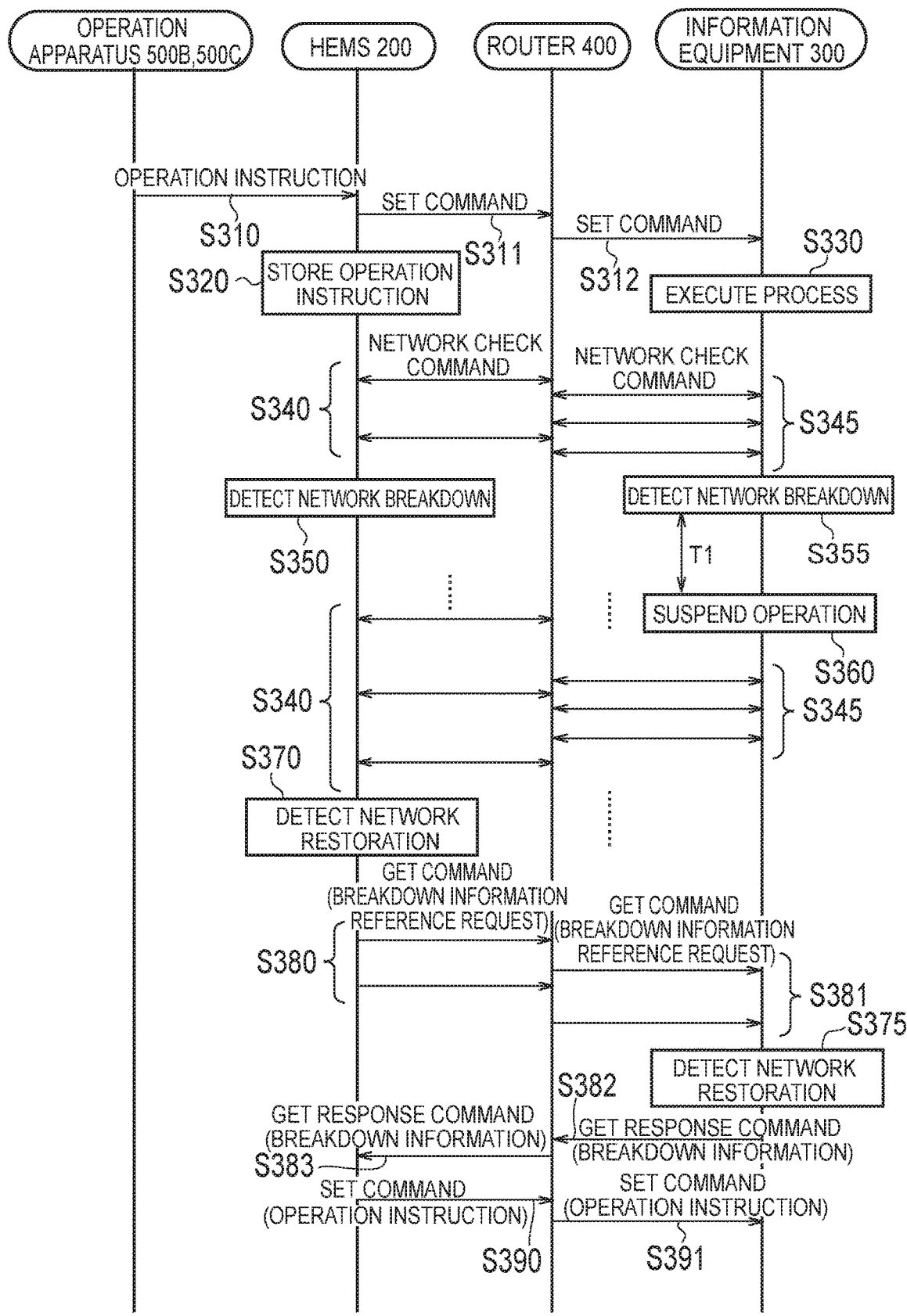
FIG. 11 is a sequence diagram illustrating a control method according to the first embodiment.

A control method according to the first embodiment will be described below. FIGS. 9 to 11 are sequence diagrams illustrating a control method according to the first embodiment. FIGS. 9 to 11 illustrate an example in which communication between the HEMS 200 and the information equipment 300 is performed according to ECHONET Lite scheme.

FIG. 9 is a sequence diagram illustrating the direct operation performed by the operation apparatus 500A. In step S110, the information equipment 300 receives the operational instruction from the operation apparatus 500A.

In step S120, the information equipment 300 performs an operation (executes a process) according to the received operational instruction.

In step S130, the HEMS 200 checks whether or not the network with the router 400 has a breakdown by performing transmission and reception of the network check command with the router 400. In step S140, the information equipment 300 checks whether or not the network with the router 400 has a breakdown by performing transmission and reception of the network check command with the router 400. The process of step S130 and the process of step S140 are assumed to be performed periodically, respectively.

In step S150, the HEMS 200 detects that the network with the router 400 has a breakdown. Specifically, when no response is received from the router 400 in response to the network check command transmitted by the HEMS 200, the HEMS 200 detects the breakdown of the network.

In step S160, the information equipment 300 detects that the network with the router 400 has a breakdown. Specifically, when no response is received from the router 400 in response to the network check command transmitted by the information equipment 300, the information equipment 300 detects the breakdown of the network.

In step S170, the information equipment 300 detects the network with the router 400 has been restored. Specifically, when the response is received from the router 400 again after the response to the network check command transmitted by the information equipment 300 has not been obtained, the information equipment 300 detects the restoration of the network.

In step S180, the HEMS 200 detects that the network with the router 400 has been restored.

In FIG. 9, a timing of the detection (step S170) of the network restoration by the information equipment 300 is assumed to be earlier than a timing of the detection (step S180) of the network restoration by the HEMS 200, but it should be noted that the timings change, for example, according to a cycle of transmission and reception of the network check command.

As described above, when the operational instruction is received from the operation apparatus 500A, the information equipment 300 maintains the operation (the state in which the process has been executed) according to the operational instruction received in step S110 although the breakdown of the network is detected.

FIG. 10 is a sequence diagram when the operational instruction is transmitted from the HEMS 200 to the information equipment 300. Particularly, FIG. 10 is a sequence diagram focusing on the operation of the information equipment 300.

In step S210, the operation apparatus 500B or the operation apparatus 500C transmits the operational instruction to the HEMS 200. Here, it should be noted that the operation apparatus 500C transmits the operational instruction to the HEMS 200 via the server 600.

In step S211, the HEMS 200 includes the operational instruction in the SET command, and transmits the SET command. Here, the operational instruction transmitted by the HEMS 200 may be the operational instruction generated by the HEMS 200 or the operational instruction received from the operation apparatus 500B or the operation apparatus 500C.

In step S212, the router 400 transmits the SET command to the information equipment 300.

In step S220, the HEMS 200 stores the operational instruction.

In step S230, the information equipment 300 performs the operation (executes the process) according to the received operational instruction.

In step S240, the HEMS 200 checks whether or not the network with the router 400 has a breakdown by performing transmission and reception of the network check command with the router 400. In step S245, the information equipment 300 checks whether or not the network with the router 400 has a breakdown by performing transmission and reception of the network check command with the router 400. The process of step S240 and the process of step S245 are assumed to be performed regularly, respectively.

In step S250, the HEMS 200 detects that the network with the router 400 has a breakdown. Specifically, when no response is received from the router 400 in response to the network check command transmitted by the HEMS 200, the HEMS 200 detects the breakdown of the network.

In step S255, the information equipment 300 detects that the network with the router 400 has a breakdown. Specifically, when no response is received from the router 400 in response to the network check command transmitted by the information equipment 300, the information equipment 300 detects the breakdown of the network.

When a predetermined period of time T1 has elapsed after the breakdown of the network is detected, in step S260, the information equipment 300 suspends the operation of its own equipment.

In step S275, the information equipment 300 detects that the network with the router 400 has been restored. Specifically, when the response is received from the router 400 again after the response to the network check command transmitted by the information equipment 300 has not been obtained, the information equipment 300 detects the restoration of the network.

In step S280, the information equipment 300 transmits the breakdown notification message indicating that the network has had a breakdown to the router 400, and in step S281, the router 400 transmits the breakdown notification message to the HEMS 200. When a predetermined protocol is ECHONET Lite, the breakdown notification message is the INFO command that is transmitted by the information equipment 300 when the network restoration is detected. The information equipment 300 repeats the process of step S280 and step S281 until the response to the breakdown notification message is received from the HEMS 200.

In step S270, the HEMS 200 detects that the network with the router 400 has been restored. In FIG. 10, a timing of the detection (step S275) of the network restoration by the information equipment 300 is assumed to be earlier than a timing of the detection (step S270) of the network restoration by the HEMS 200, but it should be noted that the timings change, for example, according to a cycle of transmission and reception of the network check command.

In step S290, the HEMS 200 transmits the SET command including the stored latest operational instruction to the router 400, and in step S291, the router 400 transmits the SET command to the information equipment 300.

As described above, when the information equipment 300 is operating according to the operational instruction received from the HEMS 200, if the network is restored after the breakdown, the information equipment 300 transmits the breakdown notification message to the HEMS 200. Thus, the information equipment 300 can return to the operation state before the network breakdown by notifying the HEMS 200 of the fact that the network has had a breakdown and causing the HEMS 200 to retransmit the latest operational instruction.

FIG. 11 is a sequence diagram when the operational instruction is transmitted from the HEMS 200 to the information equipment 300. Particularly, FIG. 11 is a sequence diagram focusing on the operation of the HEMS 200.

In step S310, the operation apparatus 500B or the operation apparatus 500C transmits the operational instruction to the HEMS 200. Here, it should be noted that the operation apparatus 500C transmits the operational instruction to the HEMS 200 via the server 600.

In step S311, the HEMS 200 includes the operational instruction in the SET command, and transmits the resulting SET command. Here, the operational instruction transmitted by the HEMS 200 may be the operational instruction generated by the HEMS 200 or the operational instruction received from the operation apparatus 500B or the operation apparatus 500C.

In step S312, the router 400 transmits the SET command to the information equipment 300.

In step S320, the HEMS 200 stores the operational instruction.

In step S330, the information equipment 300 performs the operation (executes the process) according to the received operational instruction.

In step S340, the HEMS 200 checks whether or not the network with the router 400 has a breakdown by performing transmission and reception of the network check command with the router 400. In step S345, the information equipment 300 checks whether or not the network with the router 400 has a breakdown by performing transmission and reception of the network check command with the router 400. The process of step S340 and the process of step S345 are assumed to be performed regularly, respectively.

In step S350, the HEMS 200 detects that the network with the router 400 has a breakdown. Specifically, when no response is received from the router 400 in response to the network check command transmitted by the HEMS 200, the HEMS 200 detects the breakdown of the network.

In step S355, the information equipment 300 detects that the network with the router 400 has a breakdown. Specifically, when no response is received from the router 400 in response to the network check command transmitted by the information equipment 300, the information equipment 300 detects the breakdown of the network.

When a predetermined period of time T1 has elapsed after the breakdown of the network is detected, in step S360, the information equipment 300 suspends the operation of its own equipment.

In step S370, the HEMS 200 detects that the network with the router 400 has been restored. Specifically, when the response is received from the router 400 again after the response to the network check command transmitted by the HEMS 200 has not been obtained, the HEMS 200 detects the restoration of the network.

In step S380, the HEMS 200 transmits the request command (the GET command) for requesting transmission of the breakdown notification message to the router 400, and in step S381, the router 400 transmits the GET command to the information equipment 300. The process of step S380 and step S381 is repeated until the HEMS 200 receives the GET response command from the information equipment 300.

In step S375, the information equipment 300 detects that the network with the router 400 has been restored. In FIG. 11, a timing of the detection (step S375) of the network restoration by the information equipment 300 is assumed to be later than a timing of the detection (step S370) of the network restoration by the HEMS 200, but it should be noted that the timings change, for example, according to a cycle of transmission and reception of the network check command.

In step S382, the information equipment 300 transmits the GET response command including the network breakdown information to the router 400, and in step S383, the router 400 transmits the GET response command to the HEMS 200.

In step S390, the HEMS 200 transmits the SET command including the stored latest operational instruction to the router 400, and in step S391, the router 400 transmits the SET command to the information equipment 300.

As described above, when the information equipment 300 is operating according to the operational instruction received from the HEMS 200, if the network is restored after the breakdown, the HEMS 200 transmits the SET command including the latest operational instruction to the information equipment 300 according to the breakdown notification message from the information equipment 300. Thus, the HEMS 200 can cause the information equipment 300 to operate in the state before the network breakdown by detecting that the network connected to the information equipment 300 has had a breakdown and retransmitting the latest operational instruction to the information equipment 300.

OTHER EMBODIMENTS

The present invention has been described in connection with the above embodiment, but a statement and a drawing describing a part of this disclosure are not intended to limit the invention. Various alternative embodiments, examples, and operation techniques are obvious to those having skill in the art from this disclosure.

In the embodiment, ECHONET Lite has been described as a predetermined protocol. However, the embodiments are not limited thereto, and any other protocol (for example, ZigBee (a registered trademark), KNX, or the like) than ECHONET Lite may be used as a predetermined protocol. Alternatively, a combination of ECHONET Lite and another communication protocol may be used as a predetermined protocol.

In the embodiment, the three types, that is, the inside-consumer's facility operation (the direct operation), the inside-consumer's facility operation (the indirect operation), and the outside-consumer's facility operation have been described as the route type of the operational instruction. However, the embodiments are not limited thereto. Two types, that is, the inside-consumer's facility operation and the outside-consumer's facility operation may be used as the route type of the operational instruction. Alternatively, the route type of the operational instruction may be an operation other than the direct operation and the direct operation.

In the embodiment, the network breakdown information has been described as one of properties of ECHONET equipment object specified in ECHONET Lite. However, the embodiments are not limited thereto. The network breakdown information may be included in a message as an arbitrary format of data.

In the embodiment, the information equipment 300 specifies the inside-consumer's facility operation and the outside-consumer's facility operation according to the difference in the format of the message including the operational instruction. However, the embodiments are not limited thereto. The information equipment 300 may specify the inside-consumer's facility operation and the outside-consumer's facility operation, for example, by checking the transmission source IP address.

The embodiment has been described in connection with the example in which the control apparatus is the HEMS 200. However, the embodiments are not limited thereto. The control apparatus may be installed in the CEMS 20 or may be installed in the smart server 40. Alternatively, the control apparatus may be installed in the building energy management system (BEMS), may be installed in the factory energy management system (FEMS), or may be installed in the store energy management system (SEMS).

In the embodiment, the consumer's facility 10 includes the load 120, the PV unit 130, the storage battery unit 140, the fuel cell unit 150, and the hot-water storage unit 160. However, the consumer's facility 10 may include any one of the load 120, the PV unit 130, the storage battery unit 140, the fuel cell unit 150, and the hot-water storage unit 160.

The entire contents of Japanese Patent Application No. 2013-81677 filed on Apr. 9, 2013 are incorporated herein by reference.

INDUSTRIAL APPLICABILITY

According to the present invention, it is possible to provide information equipment, a control apparatus, and a control method, which are capable of remotely controlling the information equipment in view of a problem such as a security aspect.

The invention claimed is:

1. Information equipment that is controlled by a control apparatus, comprising:
 a transceiver configured to perform communications, conforming to a predetermined protocol, with the control apparatus via a local area network connected to the control apparatus, wherein the transceiver is configured to receive an operational instruction from the control apparatus via the local area network, wherein the control apparatus is configured to transmit the operational instruction in response to receiving a remote operation transmitted via a wide area network from an operation apparatus located outside a power consumer's facility; and
 a controller configured to control an operation of at least one of a distributed power supply, a power storage apparatus, or a thermal storage apparatus that constitutes the information equipment located in the power consumer's facility, according to the operational instruction received by the transceiver,
 wherein, after or before receiving the operational instruction, the transceiver transmits a breakdown notification message indicating that the local area network has had a breakdown to the control apparatus when the local area network is restored after the breakdown.

2. The information equipment according to claim 1, further comprising, a storage unit configured to store a network breakdown information indicating information related to the breakdown of the local area network, wherein the breakdown notification message includes the network breakdown information, and is an information notification command that is transmitted to the control apparatus through the transceiver when the controller detects the restoration of the local area network.

3. The information equipment according to claim 2, wherein the controller suspends the operation of the at least one of the distributed power supply, the power storage apparatus, or the thermal storage apparatus that constitutes the information equipment located in the power consumer's facility, when the breakdown is detected.

4. The information equipment according to claim 3, wherein the network breakdown information includes a cause-associated operation state indicating an operation state of the information equipment according to a cause.

5. The information equipment according to claim 2, wherein
 if the information equipment is operating according to the operational instruction, when the breakdown is detected, the controller suspends the operation of the at least one of the distributed power supply, the power storage apparatus, or the thermal storage apparatus that constitutes the information equipment located in the power consumer's facility, and
 if the information equipment is operating according to an instruction received without intervention of the control apparatus, even when the breakdown is detected, the controller does not suspend the operation of the at least one of the distributed power supply, the power storage apparatus, or the thermal storage apparatus that constitutes the information equipment located in the power consumer's facility.

6. The information equipment according to claim 2, wherein
 if the operational instruction is an outside-consumer's facility operational instruction which the control apparatus receives from a server located outside the consumer's facility via the wide area network, and the information equipment is operating according to the outside-consumer's facility operational instruction, when the breakdown is detected, the controller suspends the operation of the at least one of the distributed power supply, the power storage apparatus, or the thermal storage apparatus that constitutes the information equipment located in the power consumer's facility, and
 if the operational instruction is an inside-consumer's facility operational instruction which the control apparatus receives via the local area network without intervention of the server, and the information equipment is operating according to the inside-consumer's facility operational instruction, even when the breakdown is detected, the controller does not suspend the operation of the at least one of the distributed power supply, the power storage apparatus, or the thermal storage apparatus that constitutes the information equipment located in the power consumer's facility.

7. The information equipment according to claim 3, wherein the controller suspends the operation of the at least one of the distributed power supply, the power storage apparatus, or the thermal storage apparatus that constitutes the information equipment located in the power consumer's facility, when a predetermined period of time elapses after the breakdown is detected.

8. The information equipment according to claim 7, wherein the controller transmits the breakdown notification message to the control apparatus when the restoration is detected after the operation of the information equipment is suspended due to the breakdown.

9. The information equipment according to claim 1, wherein the transceiver repeatedly transmits the breakdown notification message until a response is received from the control apparatus after the breakdown notification message is transmitted.

10. The information equipment according to claim 1, wherein the predetermined protocol is ECHONET Lite.

11. The information equipment according to claim 2, wherein the network breakdown information is one of properties of ECHONET equipment object specified in ECHONET Lite.

12. The information equipment according to claim 2, wherein when the receiver receives a request command for requesting notification of a state of the information equipment from the control apparatus after the controller detects the restoration, the transceiver transmits a response command responding to the request command to the control apparatus, the response command including the network breakdown information.

13. A control apparatus that controls information equipment, comprising:

a transceiver configured to perform communications, conforming to a predetermined protocol, with the information equipment via a local area network connected to the control apparatus, and configured to transmit an operational instruction to the information equipment via the local area network, wherein the transceiver is configured to transmit the operational instruction in response to receiving on a remote operation transmitted via a wide area network from an operation apparatus located outside a power consumer's facility, wherein the operational instruction controls an operation of at least one of a distributed power supply, a power storage apparatus, or a thermal storage apparatus that constitutes the information equipment located in the power consumer's facility, and wherein when the local area network is restored after a breakdown, the transceiver transmits the operational instruction to the information equipment.

14. The control apparatus according to claim 13, further comprising, a storage unit configured to store the operational instruction, and wherein when a breakdown notification message indicating that the local area network has had a breakdown is received from the information equipment, the transceiver transmits a setting command including a latest operational instruction stored in the storage unit to the information equipment.

15. The control apparatus according to claim 14, wherein the transceiver repeatedly transmits a request command for requesting transmission of the breakdown notification message to the information equipment when the local area network is restored.

16. The control apparatus according to claim 13, wherein the predetermined protocol is ECHONET Lite.

17. A control method used in a control system including information equipment located in a power consumer's facility and a control apparatus that controls the information equipment, the control method comprising:

(A) performing, by a transceiver of the control apparatus, communications conforming to a predetermined protocol, with the information equipment via a local area network connected to the control apparatus, wherein the transceiver transmits an operational instruction to the information equipment via the local area network in response to receiving a remote operation transmitted via a wide area network from an operation apparatus located outside the power consumer's facility, wherein the operational instruction controls an operation of at least one of a distributed power supply, a power storage apparatus, or a thermal storage apparatus that constitutes the information equipment located in the power consumer's facility (B) operating, by the information equipment, according to the operational instruction given from the control apparatus via the local area network;

(C) transmitting, by the information equipment, a breakdown notification message indicating that the local area network has had a breakdown to the control apparatus when the network is restored after the breakdown; and (D) transmitting, by the control apparatus, the operational instruction to the information equipment when the control apparatus receives the breakdown notification message.

18. The information equipment according to claim 1, wherein the transceiver transmits the breakdown notification message when the operational instruction comprises a remote control made through the wide area network.

19. The control apparatus according to claim 13, comprising a receiver configured to receive a breakdown notification message indicating that the local area network has had a breakdown upon a restoration of the breakdown when the operational instruction comprises a remote control made through the wide area network, and a controller configured to determine that the local area network is restored after the breakdown based on the breakdown notification message.

20. The control method according to claim 17, wherein the step (C) comprises transmitting the breakdown notification message when the operational instruction comprises a remote control made through the wide area network.

* * * * *